Aug. 12, 1969     L. C. BIXBY ET AL     3,460,460

INFRARED HEATING DEVICE

Filed Feb. 1, 1966     2 Sheets-Sheet 1

INVENTOR.
LEON C. BIXBY
EUGENE S. HALLIWILL
BY
*Dybvig and Dybvig*
HIS ATTORNEYS Aug. 12, 1969  L. C. BIXBY ET AL  3,460,460

INFRARED HEATING DEVICE

Filed Feb. 1, 1966  2 Sheets-Sheet 2

INVENTOR.
LEON C. BIXBY
EUGENE S. HALLIWILL
BY  *Dybvig and Dybvig*
HIS ATTORNEYS

United States Patent Office 3,460,460
Patented Aug. 12, 1969

3,460,460
INFRARED HEATING DEVICE
Leon C. Bixby, Fairgrounds Road, and Eugene S. Halliwill, Wellington, Ohio 44090; said Halliwill assignor to said Bixby
Filed Feb. 1, 1966, Ser. No. 524,121
Int. Cl. A47i 27/62, 37/88, 43/18
U.S. Cl. 99—327                    11 Claims

ABSTRACT OF THE DISCLOSURE

An apparatus to controllably expose a subject, such as meat, to infrared radiation emanating from a source of infrared radiation comprises a rotatable grill to support the subject, means to position the grill at differing distances from the source, and programmed control means to rotate the grill and thereby expose various sides of the subject to the infrared radiation for varying times and at varying distances so as to both sear and cook the subject.

---

This invention relates to an infrared heating device and more particularly to a cooking device utilizing infrared radiation and operating on a controlled cooking cycle, however, the invention is not necessarily so limited.

It is known to cook foodstuffs with heat sources comprising primarily infrared radiation. A common example is found in charcoal broilers. In such broilers, however, the cooking heat is actually a mixture of infrared radiation emanated from hot coals, various gases released by the coals, and the surrounding atmosphere heated by the coals. This mixture is a fortuitous mixture when used to cook meat products, as an example. Thus pure infrared radiation would not, at the temperatures encountered, produce a satisfactory searing and browning of the meat. This is because infrared radiation is a penetrating radiation which will not preferentially heat the surface of the meat and, rather, tends to cook the meat uniformly throughout. The charcoal fire, however, by producing hot gases in addition to infrared radiation provides, in the hot gases, a secondary source of heat which heats only the surface of the meat and therefore browns and sears the outer surface of the meat as the infrared radiation cooks the interior body of the meat.

In view of the fortuitous mixture of heating effects encountered with charcoal broilers, charcoal has become a popular fuel for broiling meat products, especially beefsteaks. Contrarywise, pure infrared heaters such as exist on the market have received only casual attention as a heat source for cooking meat products.

Through a series of carefully conducted experiments we have found it possible to adequately sear meat products such as beefsteaks with essentially pure infrared heat sources. Without purporting to fully comprehend the phenomenon encountered, we have discovered that, within a very narrow operating range, a high temperature infrared source occupying a plane approximately equal in area to a confronting meat surface and positioned very close to the meat surface will sear and brown such surface without appreciably cooking the interior body of the meat. The searing effect is possibly due in part to atmospheric conduction of heat from the surface of the source to the meat. It is also possibly due in part to an exceptionally high infrared intensity at the surface of the meat which promotes a modest surface browning or carbonization which, in turn, intensifies infrared absorption at the surface of the meat.

A particularly surprising observation is that the meat can be withdrawn to a less intense field of infrared radiation whereupon the searing and browning ceases, but whereupon a penetrating cooking action continues.

The phenomena observed provide a uniquely convenient cooking or broiling process. Thus, the high intensity, close range sear operation can be carefully controlled as to the time of the operation to provide a desired degree of brownness on an essentially rare body of meat. A cook operation at a greater distance from the infrared source can next be performed at a controlled time and distance to achieve the desired degree of interior cooking without appreciably altering the exterior coloring initially produced.

To illustrate, we find that when using a planar infrared source, the surface temperature of the source should be about 1700° F. and possibly higher, but not less than 1500° F. For searing with a 1700° F. source, we find that the beefsteak surface should be approximately one and one-half inches from the surface of the source and not more than two inches from the source. With a 1700° source and beefsteak located one and one-half inches from the source, searing of one side to resemble a typical charcoal broiled steak occurs in approximately one minute. If the beefsteak is next withdrawn to approximately six inches from the source, cooked approximately two and one-half minutes, and the same sear and cook conditions repeated for the opposite side of the steak, a one inch thick beefsteak will be desirably browned and cooked to a medium, as opposed to rare or well done, state.

Other degrees of interior cooking are readily obtained by varying the cooking distance or the time, or both.

As above indicated, we have found that the searing and browning effect requires an intense source at close distance and proceeds very rapidly, the browning being completed in about 60 seconds. We have also found that a decrease in source temperature or an increase in the sear distance merely detracts from the appearance of the seared surface. Thus, the sear time cannot be increased by changes in the searing geometry without destroying the effect sought. As a consequence, we have found it necessary to control the sear time to an accuracy measured in seconds.

Even in the cook operation we have found it desirable to control the cook time to an accuracy measured in seconds. Thus, for a given steak thickness and texture (fat content) the difference between a well done cook and a rare cook is measured in seconds and adjustments measured in seconds are necessary when cooking steaks of a different texture and/or thickness.

Accordingly, we have found that a successful application of the phenomena we have observed requires apparatus capable of accurately (and adjustably) controlling both cook and sear times and for accurately positioning the meat to be cooked preparatory to both the sear and cook operations.

An object of the present invention is to provide a new and improved infrared heating apparatus.

Another object of this invention is to provide a new and improved infrared cooking apparatus and, more specifically, an infrared broiling device.

A further object of this invention is to provide a new and improved apparatus for the broiling of meat products with infrared radiation.

Other objects and advantages reside in the construction of parts, the combination thereof, and the mode of operation, as will become more apparent from the following description.

Figure 1:
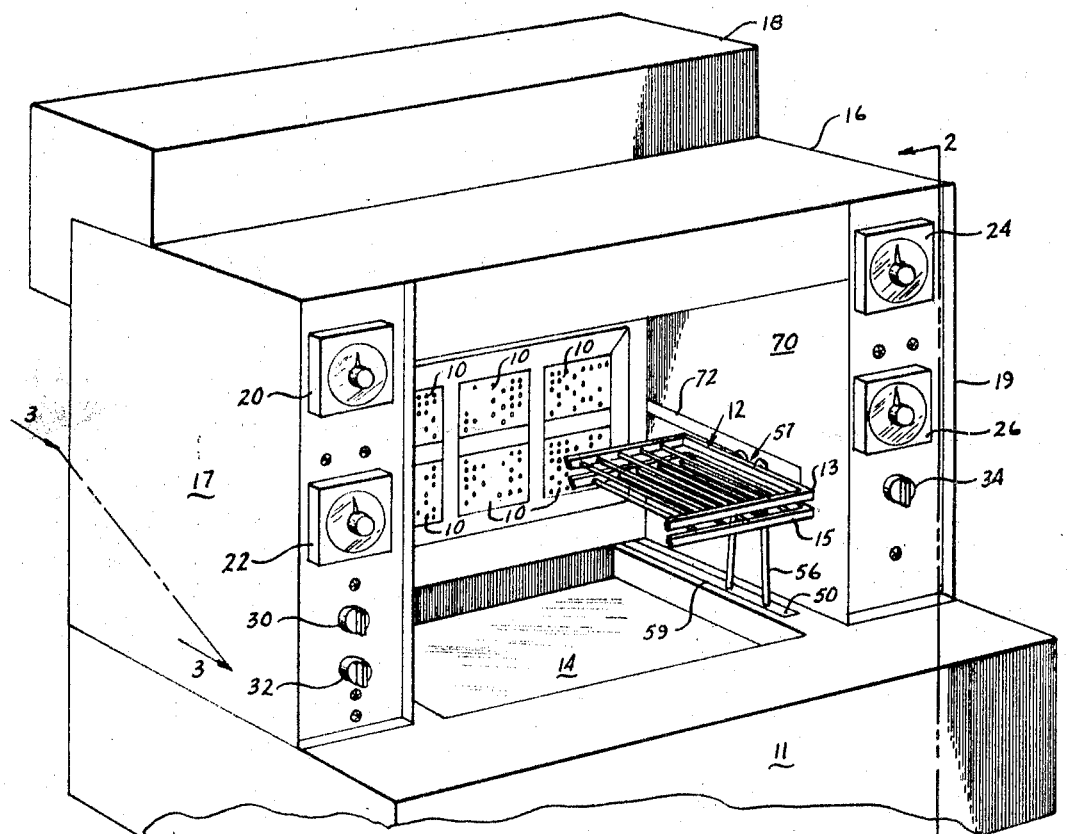
FIGURE 1 is a perspective view, with a portion broken away, of a cooking apparatus embodying the present invention.

The apparatus of FIGURE 1 supports an array of six ceramic gas burners 10, these burners being of the type having minute perforations through which gas may be caused to flow. Upon ignition of the gas, combustion takes place at the surface of the ceramic burners 10. The burners are preferably operated to provide a surface temperature of approximately 1700° F.

Figure 2:
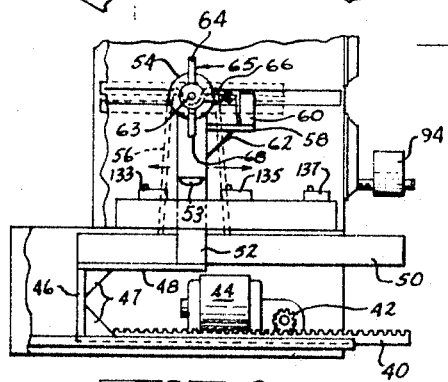
FIGURE 2 is a side elevation view taken substantially in the direction indicated by the line 2—2 of FIGURE 1 with portions broken away to reveal interior construction.

In the apparatus disclosed, the burners 10 are operated with the aid of solenoid gas valves such as shown at 94 in FIGURE 2 of the drawing. The gas valves are of a commercially available type wherein the valve is normally closed. When a switch directs electricity to the solenoid in the valve the solenoid unseats the valve and gas flows. Pilot burners (not shown) operating in association with the solenoid valves automatically ignite the gas when the gas flows and, of course, automatically de-energize the solenoid to cut off gas flow when the pilot flame goes out. For reasons which will become more apparent in the following, two solenoid gas valves are used in the present invention, one selectively limiting the operation of certain ones of the gas burners 10.

The array of burners 10 confronts a grill 12 supported above a base 11 having a tray 14 adapted to collect liquids exuded from material supported in the grill 12. The grill 12 is preferably provided with separable confronting and pivotally joined grill sections 13 and 15 between which a slab of meat or the like may be supported.

The grill 12 and confronting burners 10 are assembled under a hood 16 having upright sides 17 and 19 and having, at the upper rear thereof, an exhaust duct 18 through which vapors released by the material exposed to the infrared radiation of the burners 10 are exhausted. The hood 16 and elements associated therewith constitute a first frame assembly supporting the infrared source.

The exhaust mechanism is of conventional construction and, forming no part of the present invention, is not described in detail herein.

Mounted upon the front face of the hood 16 are sear timing devices 20 and 22 and cook timing devices 24 and 26 which will be described in greater detail in the following portion of this specification. Also mounted on the front face of the hood 16 are control switches 30, 32, and 34 which will also be described in greater detail in a later portion of this specification.

Disposed internally and centrally of the base 11 is an electric motor 44 driving flanking pinions only one of which, pinion 42, is illustrated in FIGURE 2. The pinions drive matched rack assemblies, there being one rack assembly located under each side 17 and 19 of the hood 16. Only the rack assembly located under the side 19 is illustrated in FIGURE 2 and it will be understood that the opposite rack assembly under the side 17 is of similar construction except as will be hereinafter noted.

The rack assembly under the side 19 includes a rack 40 driven inwardly and outwardly by the pinion 42, the terms inwardly and outwardly being here used to designate movement toward the plane of the burners 10 (inwardly of the hood 16) and movement away from the plane of the burners 10 (outwardly of the hood 16). Fixedly attached to the outward end of the rack 40 is a vertical post 46 supporting a rearwardly projecting platform 48. As shown, the platform 48 may be reinforced by suitable gussets 47. The platform 48 supports an upwardly projecting pedestal 52 which cradles a grill drive motor 54. The pedestal 52 and motor 54 are disposed behind a panel 70 constituting the inside wall of the side 19.

Also mounted on the platform 48 is an elongated frame member 50 which supports an upwardly projecting bracket 56. The bracket 56 is in the form of a generally U-shaped wire having a notch or recess 57 at the top thereof which supports one end of the grill 12. As clearly appears in FIGURE 1, the bracket 56 projects upwardly from the base 11 through an elongate window 59 into the open interior of the hood 16.

Since both the bracket 56 and the pedestal 52 are fixed to the platform 48 it will be apparent that rotation of the motor 44 will result in unison movement of the pedestal 52 and bracket 56 inwardly and outwardly of the hood 16. The window 59 is elongated so as not to interfere with such movements. This window is closed at all times by the elongated frame member 50 previously described.

The matched rack assembly under the side 17 of the hood 16 drives a matching bracket to rotatably support the opposite end of the grill 12, such bracket moving through an elongated window duplicating the window 59 at the opposite side of the hood 16. This matched rack assembly differs from the one illustrated in that it does not include a second motor 54 and support therefor.

Projecting laterally from the grill section 15 is a stub shaft, not shown, which is cradled in the recess 57 of the bracket 56 and which projects through a window 72 in the panel 70 to where it is keyed to the motor 54. The elongated window 72 permits the grill 12 to move inwardly and outwardly in unison with the bracket 56 and with the motor 54. The opposite end of the grill section 15 has a complementary stub shaft, not shown, which is cradled in the complementary bracket at the left side of the hood assembly, as viewed in FIGURE 1. The brackets, together with their supporting elements, constitute a second frame assembly which, by means of the motor 44, is driven linearly relative to the first frame assembly comprising the hood 16.

The motor 54 has a shaft projecting from each end thereof, one shaft, not shown, being keyed to the grill 12 as above described and the other shaft 63 mounting a generally T-shaped cam 65 having radially projecting legs 64, 66, and 68 which successively engage a switch 60 mounted on a support 58 fixed to the pedestal 52 and reinforced by a gusset 62.

As will be described more fully in the following remarks, the cam 65 driven by the motor 54 cooperates with the switch 60 to establish rotary positions for the grill 12 in various portions of the operating cycle for the subject invention.

Figure 3:
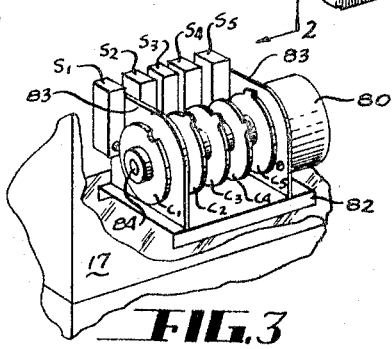
FIGURE 3 is a fragmentary view taken in the direction indicated by the line 3—3 upon removal of a side panel for the apparatus of FIGURE 1.

Mounted in the left side 17 for the hood 16 is a cam timer assembly illustrated in FIGURE 3. This timer assembly includes a timer motor 80 which drives a shaft 84 at a rotary speed controlled precisely by the motor 80. Brackets 83 support the motor 80 and shaft 84 on a base 82 fixedly mounted in the left side 17 for the hood 16.

Fixed to the driven shaft 84 are cams labeled C1, C2, C3, C4, and C5. Each of the cams operates a corresponding switch, the switches being labeled S1, S2, S3, S4, and S5.

The basic operating cycle proceeds as follows. Initially, the motor 54 is idle and holds the grill 12 horizontally so that one or more slabs of meat can be inserted and locked between the grill sections 13 and 15. At the same time the motor 44 is idle and holds the grill outwardly for convenient access to the grill for the purpose of loading.

After loading, a push button is depressed whereupon motor 54 turns the grill to a vertical plane to expose one face of the meat slab or slabs to the infrared radiation emanated from the burners 10. The motor 44 next draws the grill 12 toward the burners 10 to a position very close to the burners 10. In such position the intensity of the infrared radiation field is near a maximum. The grill is held in this position for a predetermined time during which the principal action is one of searing that surface of the meat slabs which confronts the burners 10.

The present invention contemplates that plural meat slabs of varying thicknesses will be heated simultaneously in the same supporting grill and that, even when the meat slabs are of the same thickness, there will be a need to cook the meat slabs to individual tastes. For this reason, provision is made to controllably cut off one or more burners 10 during the sear operation, so as to abbreviate the searing of one or more meat slabs.

Following completion of the sear operation, the motor 44 moves the grill away from the burners 10 to a second position where the field of infrared radiation is less intense. The grill is again held a predetermined time in this second position, during which the principal action is one of penetratingly cooking the interior of the meat slabs. Here, again, provision is made to selectively cut out one or more of the burners 10 so as to abbreviate the cooking of one or more meat slabs.

As previously mentioned, there are two sear timers 20 and 22 and two cook timers 24 and 26 in the apparatus of FIGURE 1. Sear timer 20 which may be referred to as a "long" sear timer controls the overall length of the sear timing for meat placed in the grill 12. Sear timer 22 which may be referred to as the "short" sear timer limits the sear time for certain burners. Timer 22 controls one of two gas solenoid valves and, more specifically, causes closure of such valve after a predetermined time interval so as to abbreviate the sear time for a portion of the meat slabs placed in the grill 12. Thus the sear timer 22 may turn off two of the six burners 10 so as to abbreviate the sear time for the steaks exposed to such burners.

A similar result is effected with the cook timers 24 and 26, the cook timer 24 being the "long" cook timer and the timer 26 being the "short" cook timer. Timer 26 abbreviates the cooking of some of the meat slabs on the grill 12 by extinguishing two of the burners 10 before the remaining four are extinguished.

As will become clearer in later portions of this specification, the turning off of certain of the burners 10 is accomplished in a unique fashion, an understanding of which requires an understanding of the timer construction. The timers employed in the present invention each comprise a synchronous motor which performs the timing function by rotating a time registering pointer. The time is preset manually by a displacement of the pointer from a fixed end point or zero time position. The time selected is determined by the time required for the pointer to return to the zero position. When the pointer reaches the zero time position, one or more internally located switches is moved by the timing motor to open or close circuits as desired. Each timer also includes an internally located solenoid relay which is in parallel with the motor field findings. Thus when the timer motor is energized the solenoid relay is operated. This relay moves one or more switches which can be used to perform switching functions at the beginning of the time period controlled by the timer.

In the present invention the internally located relays of the timers 22 and 26 are not utilized. However, as will become more apparent in the following, the internally located relays of timers 20 and 24 are utilized. In the case of the "short" sear timer 22 and the "short" cook timer 26, switches which operate at the end of their respective timing cycles are used to deenergize a gas control solenoid so as to interrupt the operation of certain burners 10 during the sear and cook cycles.

The corresponding switches of the "long" sear and cook timers 20 and 24 are used to signify the termination of the sear and cook times, as the case may be, so as to transfer the control over circuit timing from the sear and cook timers to a program timer.

More specifically, the present apparatus involves a program timer which controls the overall operating cycle and separate sear and cook timers which take over control from the program timer during sear and cook portions of the operating cycle, thus, allowing for a wide flexibility in the sear and cook times to which the meat slabs mounted in the grill 12 are exposed.

Following the first cooking portion of the operating cycle, the grill 12 is rotated 180° to expose the opposite surfaces of the meat slabs and returned inwardly to the sear position. The opposite surfaces are then seared for predetermined times, returned to the cook position and, then, cooked for predetermined times. At this point in the operating cycle the meat slabs are cooked to a uniform texture on both sides and a substantially uniform state throughout the interior thereof.

The operating cycle is completed by the motor 54, which turns the grill 12 to a horizontal position, and by the motor 44 which moves the grill outwardly to its furtherest position from the burners 10 (load position) for removal of the cooked meat slabs and, if desired, insertion of new meat slabs for a repeated operating cycle.

As will be more fully discussed in the following, the sear, cook and load positions for the grill 12 are established by limit switches 133, 135 and 137, respectively, which are operated by a cam 53 mounted on pedestal 52, as illustrated in FIGURE 2.

Figure 4:
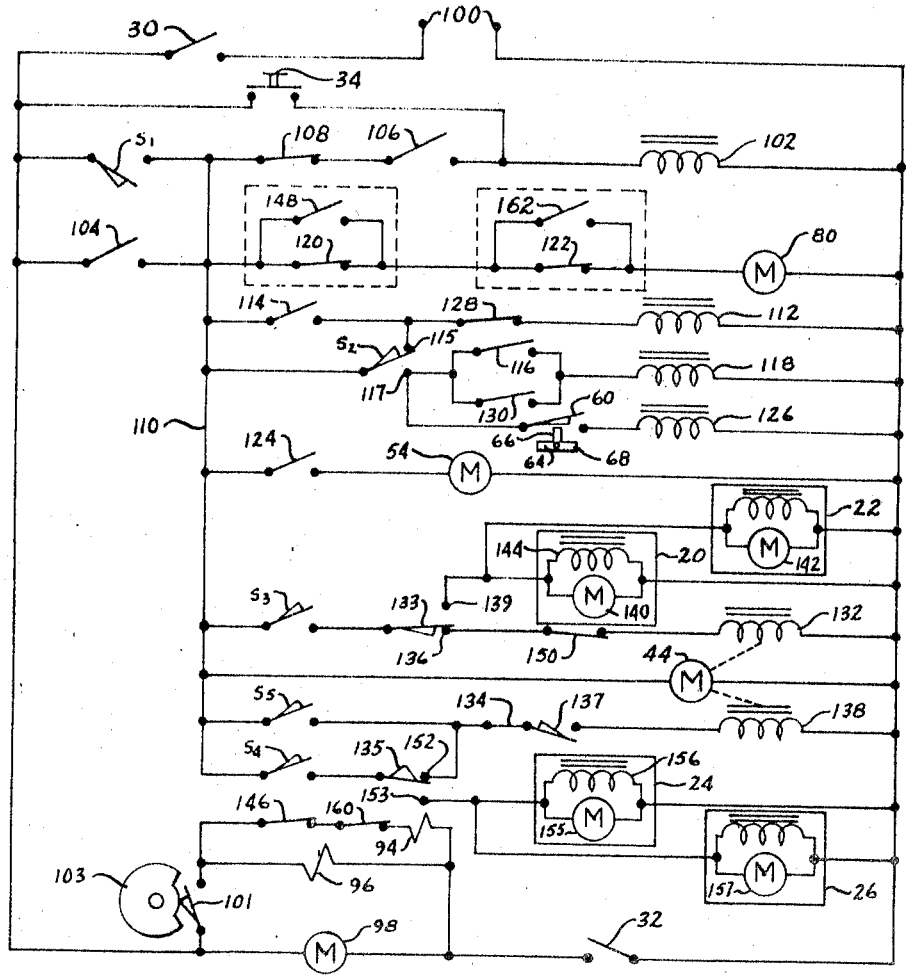
FIGURE 4 is a schematic illustration of an electrical circuit for controlling the operation of the apparatus of FIGURE 1.

A recommended circuit for controlling the operating cycle is disclosed in FIGURE 4. The particular circuit illustrated is primarily designed for cooking or broiling meats and especially beef steaks. However, it will be recognized by those skilled in the art that the circuit illustrated will accomplish numerous other functions and, with minor modifications obvious to those skilled in the art, can be adjusted to accomplish a wide variety of functions in the apparatus of FIGURE 1.

The circuit includes terminals 100 adapted for connection to a suitable source of power such as 110 volt household power. The circuit is under primary control of a power-on switch 30, illustrated on the front panel of the hood 16.

With the switch 30 in the "on" position (switch closed) the supply of gas to the burners 10 remains subject to the control of switch 32. Thus, for any operation of the subject apparatus as a heating device the switch 32 as well as the switch 30 must be closed, whereupon a fan motor 98 is energized to insure that all fumes are exhausted from the hood during operation of the burners 10.

The mere closure of the switch 32 does not result in firing of the burners 10 since solenoids 94 and 96 which control the supply of gas to the burners remain under the control of the switch 101 operated by a cam 103. The switch 101 is mounted on the support 58 adjacent the motor 54 and the cam 103 is rotated by the motor 54, these structures being obscured from view in FIGURE 2.

After closure of the switches 30 and 32 an operating cycle of the present apparatus can be initiated by depressing a push button switch 34. The switch 34 is shown on the exterior face of the hood in FIGURE 1. Switch 34, upon closure thereof, energizes a relay 102.

Relay 102 closes normally open switches 104 and 106. Switch 104 energizes a relay 112 through switch S2 and normally closed switch 128. Relay 112 closes normally open switch 114 to hold itself in an energized state through normally closed switch 128. This permits pressure to be removed from the push button switch 34 without interrupting the operating cycle commenced.

Relay 112 also closes switch 116 to set up relay 118 for future operation.

Switch 104 also energizes the cam timer motor 80 through normally closed switches 120 and 122. The application of power to the motor 80 initiates rotation of the shaft 84, which, by rotation of the cams C1–C5, sequentially operates the switches S1–S5.

Figure 5:
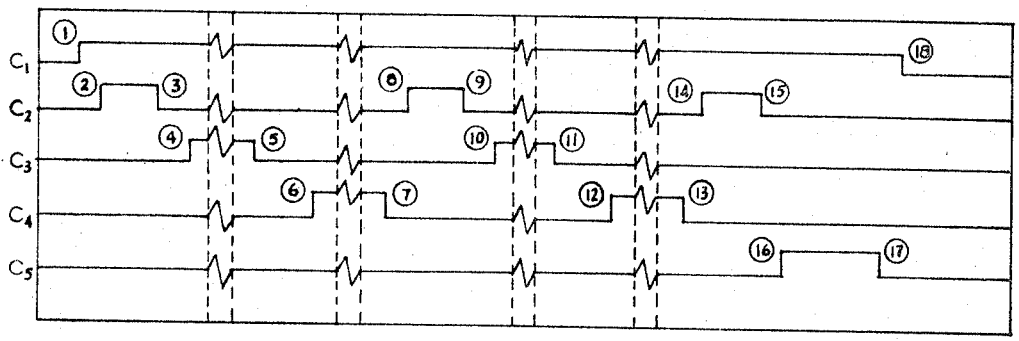
FIGURE 5 is a cycle diagram illustrating the cycle of operation of the apparatus of FIGURE 1.

The sequence or program of switch operation is diagramed schematically in FIGURE 5. This figure includes a series of five generally horizontal lines each depicting on a horizontal time scale, the operation of a cam controlled by the motor 80 throughout the operating cycle. Thus the line labeled C1 depicts the operation of the cam C1, this line illustrating a short increment of time on the left side of FIGURE 5 wherein the cam is disengaged from its switch S1 followed by a much longer increment of time extending almost throughout the entire operating cycle wherein the switch S1 remains under pressure. Application of pressure to the switch controlled by any given cam is indicated by an abrupt rise in the horizontal line depicting the cam operation.

FIGURE 5 illustrates four breaks in the operating cycle occasioned by the operation of the previously mentioned sear and cook timers which interrupt the cam timer motor 80 so as to separately control sear and cook times.

Noted on FIGURE 5 with circled numerals are various events which take place as the cam timer rotates. Thus, event 1 is the closure of switch S1 by cam C1. Event 18, the final event, is the opening of switch S1 by cam C1. In the following outline, each event depicted in FIGURE 5 is described in greater detail.

PROGRAMMED OPERATING CYCLE

Event 1.—Cam C1 closes switch S1

(a) S1 overides switch 104 to keep power on control line 110.

Event 2.—Cam C2 shifts switch S2 from contact 115 to contact 117

(a) Relay 118 fires through switch 116 which is now closed.

(1) Relay 118 opens normally closed switch 108 to cut out relay 102; (a) On cut out, relay 102 releases switches 104 and 106 which open.
(2) Relay 118 closes switch 124; (a) Switch 124 fires the drive motor 54 off line 110; ((1)) On initial rotation of motor 54, cam 103 closes switch 101 which fires gas solenoids 94 and 96; ((2)) Cam leg 66, also moved by motor 54, closes switch 60, then after 90° rotation of motor 54, cam leg 68 opens switch 60; ((a)) Closure of switch 60 fires relay 126; /1/ Relay 126 opens switch 128 to cut out relay 112; /a/ Relay 112 on cut out releases switches 114 and 116 which open; /2/ At same time, relay 126 closes switch 130 so that relay 118 will not cut out as switch 116 opens. ((b)) When switch 60 opens after 90° of grill rotation, relay 126 cuts out; /1/ On cut out, relay 126 releases switch 128 which closes, but relay 112 will not fire since switch 114 is now open; /2/ Relay 126 also releases switch 130 which opens to drop out relay 118; /a/ Switch 108 closes but relay 102 cannot fire as switch 106 is now open; /b/ Switch 124 opens to stop drive motor 54.

(At this point in the operating cycle, all burners are fired and the grill 12 is in a vertical position so that one side of each meat slab in the grill confronts the burners.)

Event 3.—Cam C2 releases switch S2 which returns to contact 115

(a) Relay 112 fires through switch 128.
(1) Switch 114 closes to hold relay 112.
(2) Switch 116 closes to again set up relay 118.

Event 4.—Cam C3 closes switch S3

(a) Relay 132 fires through switch 133.

(1) Relay 132 opens switch 134 to preclude firing of relay 138 during grill inward movement.
(2) Relay 132 energizes rack motor 44 for inward rotation; (a) Inward rack movement shifts switch 133 from contact 136 to contact 139 as the grill 12 reaches the sear position; ((1)) On shift, switch 133 cuts out relay 132 to stop motor 44; ((a)) Cut out of relay 132 permits switch 134 to close; ((2)) Switch 133 also fires sear timer motors 140 and 142 in sear timers 20 and 22, respectively; ((a)) Timer 20 coil 144 opens switch 120 to cut out cam timer motor 80 and timers 20 and 22 time out.

(At this point in the operating cycle, the program controlled by the motor 80 has been interrupted (see FIGURE 5) and the meat slabs placed in the grill 12 are being seared on time cycles controlled by the timers 20 and 22.)

((b)) Timer 22 being set for a shorter time, times out first; /1/ On time out of timer 22, motor 142 opens switch 146; /a/ Gas solenoid 94 cuts out.

(At this point in the operating cycle, the searing of a portion of the meat slabs in the grill 12 has been completed, whereas the searing of the remaining meat slabs continues.)

((c)) On time out of timer 20, motor 140 closes switch 148; /1/ Switch 148 fires cam timer motor 80.

Event 5.—Cam C3 opens switch S3

(a) Timer 20 (coil 144 and motor 140) cuts out.
(1) Switch 120 closes.
(2) Timer 20 resets; (a) At end of reset, switch 148 opens;
(b) Timer 22 (motor 142) cuts out.
(1) Timer 22 resets; (a) At end of reset, switch 146 closes; ((1)) Gas solenoid 94 fires.

(At this point in the operating cycle, all meat slabs have been seared on one side for the times selected by the timers 20 and 22 and control over the operating cycle returned to control of the motor 80.)

Event 6.—Cam C4 closes switch S4

(a) Relay 138 fires through switches 135 and 137.

(1) Relay 138 opens switch 150 to preclude firing of relay 132 during rack outward movement.
(2) Relay 138 energizes motor 44 to move rack outwardly; (a) Rack outward movement permits limit switch 133 to close without result since S3 and switch 150 are both open; (b) Rack outward movement shift switch 135 from contact 152 to contact 153; ((1)) On shift, switch 135 cuts out relay 138 to stop rack outward movement; ((a)) Cut out of relay 138 permits switch 150 to close; ((2)) Switch 135 also fires cook timers 24 and 26 having timer motors 155 and 157, respectively; ((a)) Timer 24 coil 156 opens switch 122 to cut out cam timer motor 80.

(At this point in the operating cycle, the program controlled by the motor 80 has been again interrupted and the meat slabs are being cooked at a greater distance from the burners 10 than was the case during the preceding sear portions of the operating cycle.)

((b)) Timers 24 and 26 time out with timer 26 timing out first; /1/ On timer 26 time out, motor 157 opens switch 160; /a/ Gas solenoid 94 cuts out.

(At this point in the operating cycle, the cooking of a portion of the meat slabs has been completed, whereas the cooking of the remaining meat slabs continues.)

/2/ On timer 24 time out, motor 155 closes switch 162; /a/ Switch 162 fires cam timer motor 80.

Event 7.—Cam C4 opens switch S4

(a) Timer 24 coil 156 and motor 155 cut out.

(1) Switch 122 closes.

(2) Timer 24 resets; (a) At end of reset, switch 162 opens.

(b) Timer 26 coil and motor 157 cut out.

(1) Timer 26 resets; (a) At end of reset switch 160 closes; ((1)) Gas solenoid 94 fires.

(At this point in the operating cycle, all meat slabs have been cooked on one side for the times selected by the timers 24 and 26 and control over the operating cycle returned to control of the motor 80.)

Event 8.—Cam C2 shifts switch S2 to repeat event 2 with 180° grill travel (the 180° travel results from shape of cam 65)

Event 9.—Cam C2 returns switch S2 to repeat event 3

Event 10.—Cam C3 closes switch S3 to repeat event 4

Event 11.—Cam C3 opens switch S3 to repeat event 5

Event 12.—Cam C4 closes switch S4 to repeat event 6

Event 13.—Cam C4 opens switch S4 to repeat event 7

(At this point in the operating cycle, the searing and cooking of both sides of the meat slab has been completed.)

Event 14.— Cam C2 shifts switch S2 to repeat event 2 with 90° grill travel (a) During this 90° of grill travel cam 103 releases switch 101 to cut out both gas solenoids.

(b) At the end of this 90° travel switch 60 is opened and cam 65 has returned to position shown in FIGURE 2.

Event 15.—Cam C2 returns switch S2 to repeat event 3

Event 16.—Cam C5 closes switch S5

(a) Relay 138 fires through switch 137.

(1) Relay 138 energizes rack motor to move outwardly;
 (a) Rack moves outwardly past middle limit switch 135 which is bypassed by switch S5 and ultimately opens switch 137 to cut out relay 138 and stop rack outward movement.

(At this point in the operating cycle, the supply of gas to the burners has been cut off and the grill 12 moved outwardly from the burners to the loading and unloading position.)

Event 17.—Cam C5 opens switch S5

Event 18.—Cam C1 opens switch S1

(a) Power to line 110 is cut off by opened switch S1.

(1) Relay 112 cut out.

(b) Relay 102 cannot fire because switches 34 and 106 are open, thus new cycle cannot be initiated except by closing switch 34.

From the foregoing operating cycle it will be recognized that subjects, such as meat slabs or beef steaks, can be seared in accordance with manually set time schedules during which a portion of the meat slabs may be seared for a short time and the remainder for a long time and, after searing, the same meat slabs cooked, some for a short time and the remaining for a long time. It will also be recognized that once the sear and cook timers have been manually preset, the entire operating cycle is fully automatic with operator attention being required only for the purposes of loading and unloading the material to be cooked.

Having thus described our invention, we claim:

1. Apparatus to controllably expose a subject to infrared radiation comprising: a source of infrared radiation, a first frame mounting said source, support means supporting said subject, a second frame, means mounting said support means on said second frame for rotation relative to said second frame about a first axis, means supporting said first and second frames for linear movement one relative to the other along a second axis substantially perpendicular to said first axis, first means operable to rotate said support means about said first axis, and second means to move said first and second frame members one relative to the other along said second axis, means to initiate operation of one of said first and second means, and means responsive to operation of said one means to operate the other of said first and second means.

2. The apparatus according to claim 1 wherein said second axis intersects said first axis and passes centrally through said source of infrared radiation.

3. The apparatus according to claim 1 wherein said means to initiate operation of said one of said first and second means comprises a controlled speed programming device.

4. The apparatus according to claim 3 wherein said one means is said first means operable to rotate said support means and wherein said means responsive to operation of said first means to operate said second means comprises a prime mover drivingly connected to said second means, a circuit to supply power to said prime mover, said circuit including switch means operable to interrupt the supply of power to said prime mover, and a cam rotated in unison with said support means to operate said switch means at a predetermined position of said support means.

5. The apparatus according to claim 4 including a timer responsive to operation of said second means to interrupt the operation of said programming device for a period of time established by said timer means.

6. A device of the class described comprising: plural operating assemblies, a first timer mechanism, means responsive to said first timer mechanism to sequentially initiate operation of said operating assemblies, one of said operating assemblies including a second timer mechanism and means responsive to operation of said one assembly to energize said second timer mechanism, means responsive to energization of said second timer mechanism to interrupt the operation of said first timer mechanism, and means responsive to timing out of said second timer mechanism to restore the operation of said first timer mechanism.

7. The device according to claim 6 wherein said first timer mechanism is a programming device which upon interruption of power thereto discontinues its programming function and which upon restoration of power thereto resumes its programming function at substantially the point in the program established by the programming device at which the interruption occurred.

8. The device according to claim 6 wherein said first timer mechanism includes a prime mover and parallel circuit means to conduct power to said prime mover, one of said circuit means including a normally conducting first switch operable to interrupt the conduction of power by said one circuit means, the other of said circuit means including a normally nonconducting second switch operable to establish conduction in said other circuit means, said means responsive to energization of said second timer mechanism including first deenergizable means to operate said first switch means thereby interrupting the supply of power to said first timer mechanism, said means responsive to timing out of said second timer mechanism comprising second deenergizable means to operate said second switch means thereby restoring power to said first timer mechanism, wherein said first timer mechanism includes means operable upon restoration of power thereto to deenergize said second timer mechanism, and wherein said second timer mechanism includes means responsive to deenergization thereof to deenergize said first and second deenergizable means.

9. A device of the class described comprising a processing mechanism, means to supply power to said processing mechanism, work presenting means to present an object to be processed to said processing mechanism, said work presenting means including plural operating mechanisms and a first timer mechanism to sequentially initiate operation of said operating mechanisms in accordance with a predetermined time program, and interrupter means to interrupt the time program for a controllable time interval without otherwise disturbing said time program, said interrupter means including a second timer mechanism having a time out interval, means responsive to said first mechanism to actuate said second timer mechanism, means responsive to actuation of said second timer mechanism to interrupt the supply of power to said first timer mechanism, and means responsive to time out of said second timer mechanism to restore power to said first timer mechanism whereupon said first timer mechanism resumes said predetermined time program.

10. The device according to claim 9 including a third timer mechanism having manual time interval setting means, said means responsive to said first timer mechanism to actuate said second timer mechanism also actuating said third timer mechanism, means responsive to time out of said third timer mechanism to interrupt the supply of power to said processing mechanism, and means responsive to said first timer mechanism on resumption of said time program to deactuate said third timer mechanism to restore the supply of power to said processing mechanism.

11. A device of the class described comprising: a pair of gas burners, supply means to supply gas to said burners, said supply means including valve means energizable to interrupt the gas flow to one of said burners only, a pair of timer devices one of which times a short period of time and the other which times a long period of time, support means, positioning means to present said support means to said burners to expose a subject supported by said support means to heat energy released by said burners, means operated by said positioning means upon presentation of said support means to said burners to simultaneously initiate operation of said timers, means responsive to said one timer on time-out thereof to energize said valve means to interrupt gas flow to said one burner thereby extinguishing said one burner, and means responsive to time out of said other timer to deenergize said valve means and thereby restore gas flow to said one burner.

References Cited
UNITED STATES PATENTS

| | | | |
|---|---|---|---|
| 2,297,825 | 10/1942 | Bobo | 99—397 |
| 2,997,941 | 8/1961 | Phelan et al. | 99—332 |
| 3,267,835 | 8/1966 | Romano et al. | 99—334 |

BILLY J. WILHITE, Primary Examiner

U.S. Cl. X.R.

99—397, 427; 126—41